Aug. 7, 1956

R. C. HOFFMAN 2,757,557

TRANSMISSION

Filed Nov. 4, 1947

INVENTOR.
Roscoe C. Hoffman.
BY
Harness, Dickey & Pierce
ATTORNEYS.

Aug. 7, 1956  R. C. HOFFMAN  2,757,557
TRANSMISSION
Filed Nov. 4, 1947  6 Sheets-Sheet 5

INVENTOR.
Roscoe C. Hoffman.
BY
Harness, Dickey & Pierce.
ATTORNEYS.

United States Patent Office 2,757,557
Patented Aug. 7, 1956

2,757,557

TRANSMISSION

Roscoe C. Hoffman, Detroit, Mich.

Application November 4, 1947, Serial No. 783,930

1 Claim. (Cl. 74—740)

The present invention relates to change speed gear transmissions, particularly for automotive vehicles.

An important object of the invention is to provide an improved automotive transmission mechanism incorporating both planetary gearing and conventional spur gears controllable by power operable friction clutches, the arrangement being such as to dispense with the need for a main friction clutch and to provide three or more forward speeds and one or more suitable reverse speeds, as may be desired in accordance with considerations of engineering and design, in a transmission of very simple, compact and rugged construction, and which is no designed as to include only a single planetary gear set, a simple train of spur gears, and two friction clutches.

A further object of the invention is to provide such a transmission incorporating overrunning clutch-type reaction means arranged in an improved and novel manner and functioning under certain conditions to provide a free wheeling action in reduced speed forward drives, novel means being provided for preventing free wheeling action in at least one of the reduced speed drives despite the presence of the overrunning clutches.

Still another object is to provide such a transmission which is of very simple, compact and inexpensive construction and which lends itself well to automatic control.

Another object is to provide an improved transmission construction of the character indicated incorporating a plurality of coaxially disposed power operated friction clutches for controlling the action of the transmission and a plurality of telescoping shafts projecting axially from and connected to the clutches, a planetary gear set carried upon one of the projecting shafts, spur gear means also mounted coaxially with the projecting shafts but drivable through the planetary gear set at any of a plurality of ratios, and a housing having separate compartments for the clutches and for the gear means, the gear means including a planetary set and spur gear means, both coaxial with the telescoping projecting shafts above referred to, and additional torque transmitting and reversing gear means laterally offset from but substantially parallel with respect to the planetary gear set and the aforementioned spur gear means.

Another important object of the invention is to provide automatic controlling means for a transmission of the indicated character, the controlling means being so arranged that when installed in an automotive vehicle in conjunction with such a transmission, automatic gear shifting is provided whereby changes of driving ratio are effected without requiring the exercise of skill and judgment on the part of the driver.

A related object is to provide such improved automatically operable ratio controlling means which is of greatly simplified character and so arranged that there is very little likelihood of the occurrence of any failure which would interfere with proper operation of the transmission in the intended automatic manner, the arrangement being such that the driver may exercise supervisory control at will to alter the automatic functioning when desired.

Still another object is to provide such an improved automatically operable ratio controlling system incorporating improved and simplified "kick-down" shifting means for reducing the speed ratio of the gearing whenever the engine throttle is opened wide as by pushing the accelerator pedal all the way to the floor, with the car traveling in high gear and below a predetermined speed.

An object related to that last stated is to provide improved and simplified lock-out means for the kick-down shift when the vehicle is traveling in high gear above a predetermined speed.

A still further object is to provide improved means whereby the transmission may be selectively operated in one of the lower gear ratios with either a free wheeling action or with a positive two-way drive, as the driver may desire.

Other objects and advantages will be apparent upon consideration of the present disclosure in its entirety.

In the drawings:

Fig. 9 is a diagrammatic view of the hydraulic control system and the related mechanical components;

Referring now to the drawings:

GENERAL ARRANGEMENT

In broad outline, the principal components of the transmission mechanism comprise a clutch group enclosed in a casing formed by a flywheel housing portion 84 and a complementary bell-shaped housing portion 126, and planetary gearing and a gear train housed in an extension casing 86. The transmission is adapted to be secured to an engine as 116 through a mating flange 83 on the flywheel housing 84, and to be driven by the crankshaft 1 of the engine which has a flywheel 2 bolted to its flanged end within casing 84. The flywheel 2 is provided with a rim 89 to which is attached, by means of bolts 94, a complementary cover 8 with a disk-shaped drive member 7 included in between. The controlling means for the transmission comprises hydraulic components, the functioning of which will be considered after the details of the mechanical components have been set forth.

The clutch-driving mechanism

The flywheel 2 and the cover 8 jointly support two clutch pressure plates 5 and 6 by means of a number of slidably mounted studs 3 and 4, respectively. The studs 3 as well as the studs 4 are located in a fore-and-aft direction at the outer periphery of the housing formed by the flywheel 2 and the cover 8, and have forked heads 98 and 99 projecting through and outwardly from the rear face of the cover 8. Hardened pins 11 and 13, respectively, are inserted through heads 98, 99, the opposite ends of the studs being supported and guided in the flywheel 2. The pressure plate 5 has a number of lobes 5A on its periphery formed with openings 5B therein into which the studs 3 are press fitted and against which the studs are shouldered by means of a flange 96 formed on each stud. The studs also project through the pressure plate and are slidably fitted in openings 2A in the flywheel. Similarly, the studs 4 are pressed into the pressure plate 6, and have a shouldered bearing upon it at 97 under their heads 99.

The flywheel 2 and the pressure plate 5 have opposed faces 90 and 91, respectively, between which a clutch plate 15' is included for engagement. This clutch as a whole, which may be termed the "front" or "low speed" clutch is generally designated by the numeral 15. The disk 7 and the pressure plate 6 have opposed faces 92 and 93, respectively, between which a clutch plate 16' is similarly included, and this clutch, which is termed the "rear" or "second speed" clutch, is generally designated 16.

The clutch-operating mechanism

Clutching and release of the plates 15' and 16' are accomplished by axial movement of the studs 3 and 4, respectively, toward and from the flywheel 2, either independently of each other or in unison. Engagement of clutch 15 alone establishes low or first gear; engagement of clutch 16 alone establishes second or intermediate gear, and simultaneous engagement of both clutches establishes high gear or direct drive.

For actuating the studs 3 and 4 to engage the clutches in the above manner, two groups of hydraulic cylinders are embodied in the side of the cover 8 away from the flywheel 2, one of which groups is generally designated 22 and comprises cylinders 22a, 22b and 22c, and the other of which groups is generally designated 23 and comprises cylinders 23a, 23b and 23c. The cylinders are all substantially identical and are grouped closely around a cylindrical hub 100 which is integral with the rotating cover 8, and which provides means for supplying pressure oil to the cylinders of groups 22 and 23 from the outside.

Each of the cylinders in both groups 22 and 23 has a piston as 21 slidably assembled in it to be acted upon by the oil and each is arranged to actuate, in turn, a double ended lever. The levers actuatable by cylinders 22a, 22b and 22c are designated 10 and the levers actuable by the cylinders 23a, 23b and 23c are designated 12. These levers have as their fulcrums pivot pins as 9 mounted in close proximity to the studs 3 and 4 as in lugs 95 cast on the cover 8.

Each of the levers 10 and 12 has one long finger-shaped arm reaching radially and inwardly into its corresponding cylinder, wherein its contacts the piston as 21, and one short arm which bears with a flat side as 101 against a pin in its appurtenant stud, that is, with the pin 11 in the stud 3, in the case of levers 10, while in the case of levers 12, the side 102 bears against the pin 13 in the stud 4.

For disengaging the clutches 15 and 16, the studs 3 and 4 are shifted axially back to their free positions by helical compression springs 26 and 27 arranged upon the studs 3 and 4, respectively, springs 26 reacting upon the pressure plate 5 on one side and the flywheel 2 on the other, and spring 27 reacting upon plate 6 and the flywheel.

Clutch oil pressure generation and distribution

Oil under pressure for actuating the pistons 21 is normally supplied by a front or engine-driven pump 88 which can be of any well-known or suitable type, and which is contained in a housing 103 embracing the hub 100. Hub 100 has a splined end 24 which mounts the pump rotor 88'. A pump intake port 122 communicates with a passage 123 leading down to bottom of the gear case 86 for bring oil from the sump to the suction side of the pump rotor 88'. A port 124 in the housing 103 serves for discharge of oil under pressure by the rotor 88' into a passage 125 and thence into a line 129 which leads to external ratio controlling means for the transmission. A preferred arrangement of the ratio controlling means will presently be considered.

From the ratio controlling means oil is delivered back into the transmission through two lines 127 and 128 which connect with passages 104 and 105, respectively, in the pump housing 103. Passages 104, 105 extend to the housing 103 and extension passages designated 104', 105', respectively, extend through the hub to its central bore, where they register with grooves 106 and 107, respectively, formed in the periphery of the rotating hub 100. Sealing rings are provided in the hub 100 alongside of the grooves 106 and 107 to prevent loss of oil, and it will be seen that the hub also serves as a manifold for conducting fluid to the clutch actuating cylinders.

From the grooves 106 and 107 pressure oil is conducted to the two groups of cylinders 22 and 23 by passages 117 and 119, respectively, leading behind the pistons 21 therein.

In order to salvage any oil leaking out past the pistons 21 or the rings 44, a sleeve 14 is pressed over the cylinder group, and extends from the cover 8 into a flanged ring 30 secured to pump housing 103. Sleeve 14 has a free edge 108 at its end which projects into flanged ring 30, and the ring 30 carries sealing means 30' upon its inner surface which projects over the end of the sleeve 14. Oil thrown off by the edge 108 is caught in the ring 30 and drained back into the gear case 86 through passage 25.

In order to provide an oil tight closure around the inner ends of the levers 11 and 13 and yet allow them to swing on their fulcrum pins as 9 when acted upon by the pistons 21, ferrules 28 are embodied in the sleeve 14 around the projecting ends of the levers 10 and 13, and rubber boots 29 are slipped over both the levers and the ferrules 28 to close yieldingly the clearance space between them.

The clutch driven mechanism

The two clutch plates 15' and 16' are secured to their respective splined hubs 17 and 18, the hub 17 being carried on a central shaft 19 extending through the whole length of the transmission from the flywheel 2, wherein it is supported in a bearing 109, to the end of the gear case 86 where it is carried indirectly in two bearings 41 and 43. Inside the gear case 86 the shaft 19 is formed with a gear 87 which is herein further referred to as the sun gear.

The clutch plate 16' engages by means of its splined hub 18 a tubular shaft 20 which is rotatably supported on the central shaft 19. The shaft 20 extends through the hub 100 into the gear case 86 where it carries a hardened multi-toothed cam 33, shown as integral, for a one-way coupling, and next to it a radial flange 110 which mounts and drives through toothed engagement therewith an internally toothed gear 35 which is concentric with the sun gear 87.

The planetary gearing

The sun gear 87 and the internal toothed gear 35 are members of a planetary gear set by the use of which, through the instrumentality of the clutches 15, 16, three different speed ratios are obtained.

Interposed between the sun gear 87 and the internal toothed gear 35 are three planet gears 36 which run on bearings 38 and shafts 37 in a carrier cage 39. The cage 39 is integral with a tubular shaft 40 which is rotatably mounted on the tail portion of the central shaft 19 and is supported in two bearings 41 and 43. The rear extremity of the shaft 40 is provided with splines 113.

Mounted on the shaft 40 between the bearings 41 and 43, and driven by the splines 113, is a gear 42 which is in engagement with other gears in the gear case 86 for transmitting power to the final drive.

The one-way couplings

Two one-way brakes are embodied in the mechanism, on on each of the shafts 19 and 20, to provide reaction means, each of which is adapted to hold its appurtenant shaft against unwanted reverse rotation.

The one-way reaction rake for the shaft 20 is located adjacent its flanged end 110, and may be of any of the well known types, such as the roller type shown. The inclined teeth of the cam member of the brake are designated 33, the smooth internal circular raceway 82 around the cam teeth 33 is formed in a stationary member 31, which serves also as a closure for the oil pump 88, and the rollers 32 are interposed between the teeth 33 and the raceway 82 in the usual manner, the rollers being retained in their angular spacing and axial positioning by a cage 34.

The rollers will be loose when propelled around by the abrupt or more nearly radial flanks of the teeth 33, when the shaft rotate in its normal direction, while whenever the driving torque is reversed, the rollers are wedged and the shaft 20 stopped and held, as will be apparent.

The one-way reaction brake for the central shaft 19 and the sun gear 87 thereon is located at the rear end of the shaft next to the bearing 43, and similarly comprises a conventional roller brake including a hub 49 in splined engagement with the shaft 19 and having tooth-like cam teeth 48 cut in its periphery. The internal smooth cylindrical raceway 50 is provided around the hub 49 in a flanged member 45 which is bolted to the end of the gear case 86 and provides a support for the bearing 43. Rollers 46 are guided by a cage 47, and the brake acts in like fashion to arrest reverse rotation of the shaft 19.

The device for using the engine as a brake

A disk type friction brake is employed to enable the mechanism above described to convey torque in the reverse direction from that in which it flows normally when the engine is driving. This permits using the engine as a brake for the vehicle when descending hills.

This function obtains automatically when the transmission is in high gear, but not when it is in either one of the two lower gears, but means is provided whereby intermediate, or second, speed may also be employed for engine braking.

A plate 55 is fast on the rear end of hub 49 of the one-way brake and lies close to closure plate 58 which closes the rear end of the case 86, the plate 55 being engaged with splines 57 on the hub 49 for angular drive but axial freedom of movement. The plate 55 is provided with friction facing 56 on both sides.

The plate 55 is a locking brake for the shaft 19, and to perform this function, by means of pressure oil, an annular piston 52 is embodied next to the plate 55 on the opposite side thereof from cover plate 58, adjacent the bearing support 45, and is axially movable to force the plate 55 against or loosen it with respect to cover plate 58. Piston 52 is anchored angularly to the bearing support 45 as by dowel pin 51, and is held normally disengaged and against the bearing support 45 by a number of hairpin springs 54 lodged between the piston 52 and the cover 58 around the plate 55.

Oil under pressure is fed from the outside control means to the space between the piston 52 and the bearing support 45 through a passage 53. The piston 52 is thereby forced against the pressure of the springs 54 toward the plate 55 which it compresses between piston face 112 and the inner face 111 of cover plate 58.

Final drive and reverse gear

The drive from gear 42 is conveyed to the final drive shaft 69 through an intermediate gear 60 on a shaft 63, and in all forward speeds the drive passes from gear 60 to a gear 67 on the shaft 69, a dog clutch 75 and 74, and through splines 70 to the shaft 69.

The intermediate gear 60 is integral with sleeve portion 59 which connects it with a spaced gear 61 at the opposite end of the gear case 86. Sleeve gears 60 and 61 are mounted rotatably on the shaft 63 by means of bearings 62, shaft 63 being locked against turning by a key 64 in the wall of the gear case 86.

The gear 61 is in constant mesh with a reverse idler gear 65 supported on a shaft 66 in the gear case 86.

The final drive shaft 69 is mounted in two bearings 77 and 78 near its extremities, and has a bearing portion 68 adjacent the bearing 78 on which the drive gear 67 can rotate freely when the shaft 69 is driven in reverse speed. The shaft portion adjacent the bearing 77 is provided with splines 70 on which a gear 71 is slidably mounted. The gear 71 has gear teeth 72 engageable with the reverse idler gear 65, internal dog clutch teeth 74 engageable with complemental teeth 75 on the main drive gear 67, and a groove 73 in which a shifter fork 118 operates.

Figure 8:
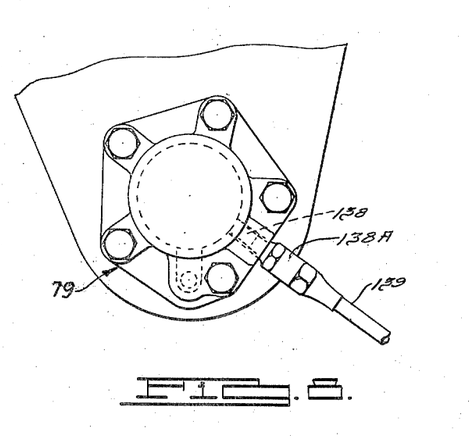
Fig. 8 is a detail elevational view taken substantially as indicated by the line and arrows 8—8 of Fig. 1.

The shaft 69 projects at both ends beyond the bearings 77 and 78, and the projecting ends are provided with splines 115 and 80, respectively. The splines 80 serve to mount a universal joint 81 for delivering power for vehicle propulsion. The splines 115 at the opposite end serve to mount and drive the rotor of the rear oil pump generally designated 79 and arranged in a housing 114 on the side of the gear case 86. The intake of oil for this pump is through a suction passage 85 at the bottom of the gear case 86, and discharge and delivery of pressure oil is through a port 138 and a line 139 leading to the outside ratio control means (see Fig. 8). The fluid from the two pumps is handled in a manner to be described. A check valve 138A in the line 138 prevents the auxiliary oil pump from drawing oil back to the sump when the vehicle is operated in reverse.

Gear shifting mechanism

Figure 1:
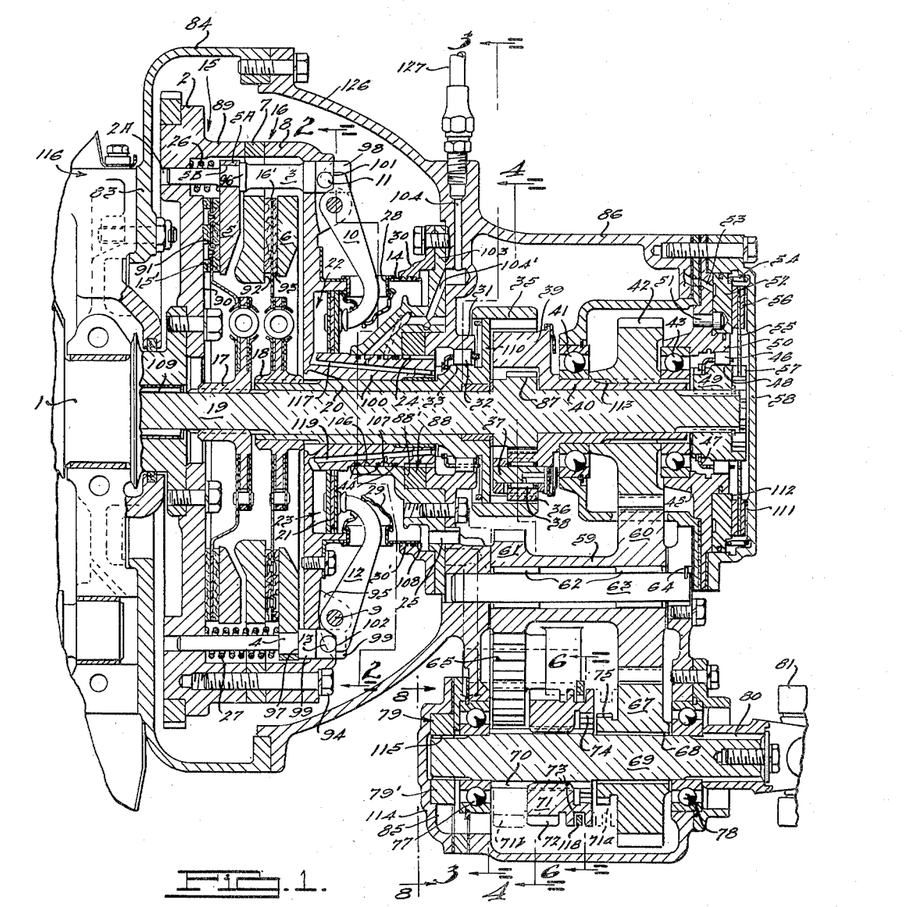
Fig. 1 is a substantially central, longitudinal, vertical sectional view of a transmission construction incorporating the principles of the present invention, fragmentarily showing the rear portion of an engine for driving the same.
Figures 2, 3, 4:
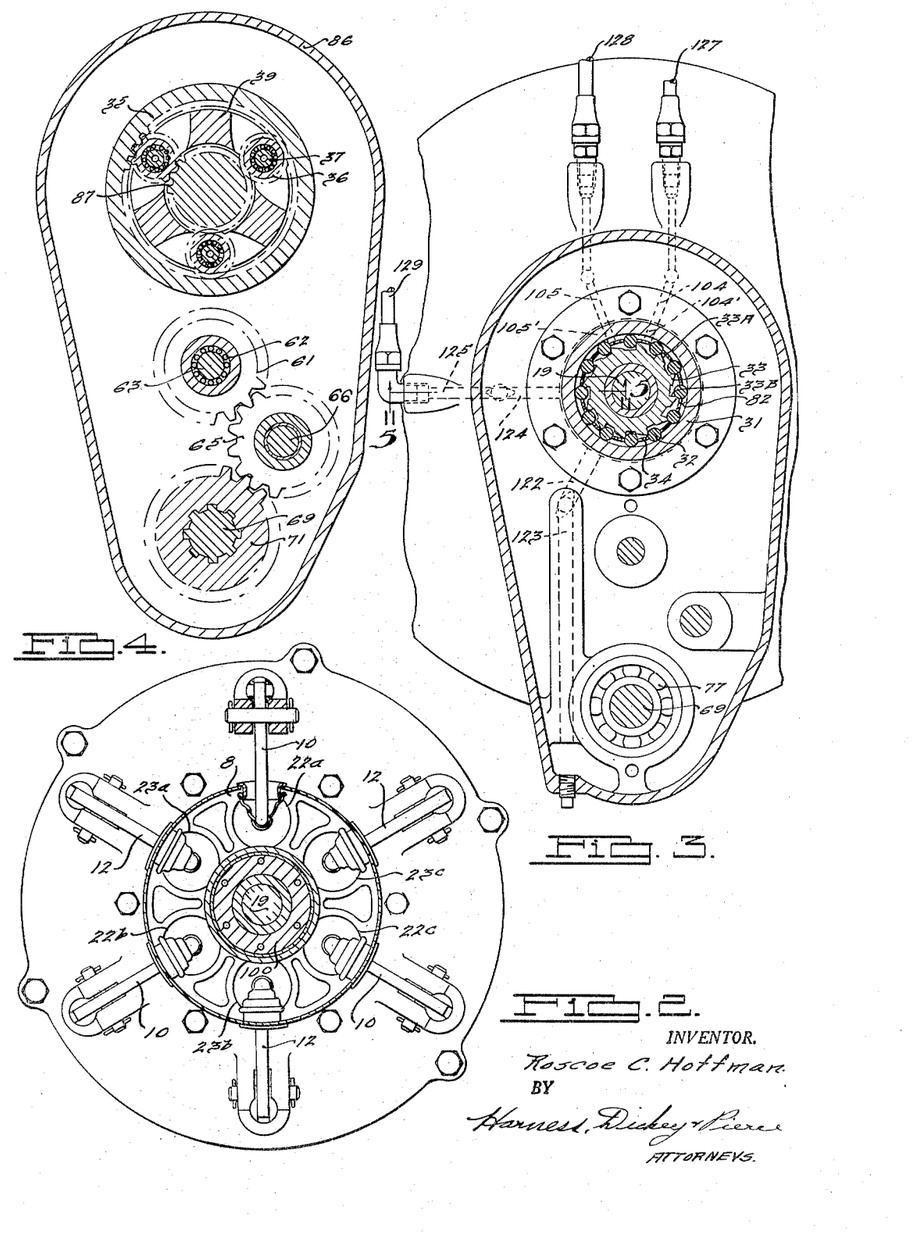
Figs. 2, 3, and 4 are cross-sectional views taken substantially on the lines 2—2, 3—3, and 4—4 respectively of Fig. 1 and looking in the direction of the arrows.
Figure 4:
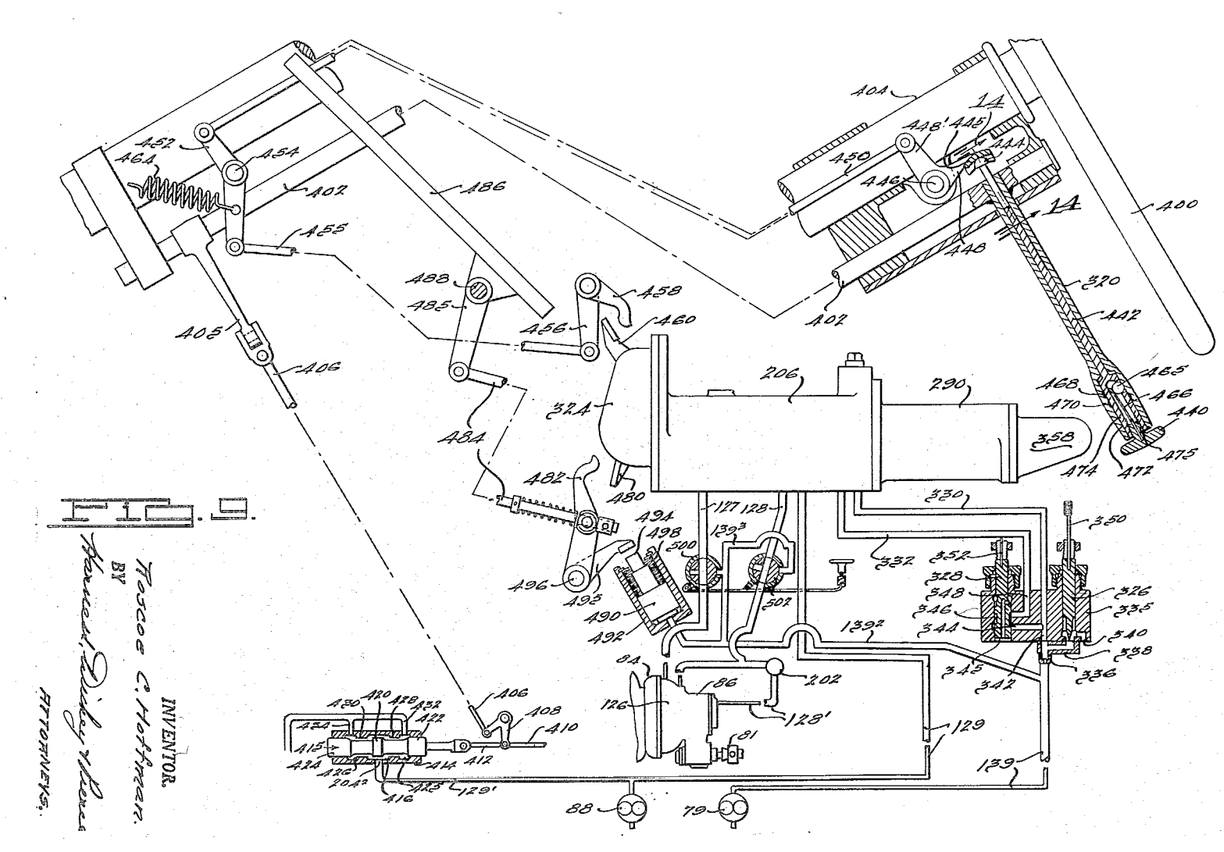
Figure 5:
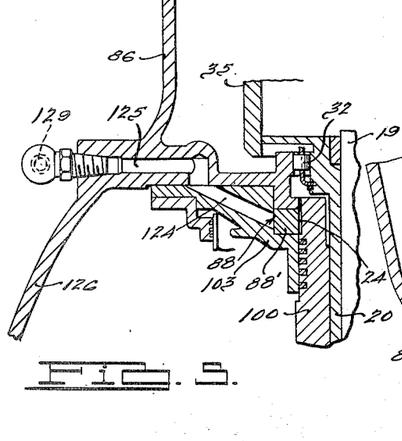
Fig. 5 is a sectional view taken substantially on the line 5—5 of Fig. 3 and looking in the direction of the arrows.

The sliding axial movement of the gear 71 is performed by means of the shifter fork 118 between the following three operative positions: (1) Extreme right-hand position as viewed in Fig. 1, shown in broken lines in that view and designated 71a, wherein the dog clutch teeth 74 are in mesh with the teeth 75 on the main drive gear 67 (2) a neutral position shown in full lines wherein neither the teeth 74 nor the teeth 72 are in mesh, and (3) an extreme left-hand position shown in broken lines and designated 71b, wherein the teeth 72 are in mesh with the reverse idler gear 65.

Figure 6:
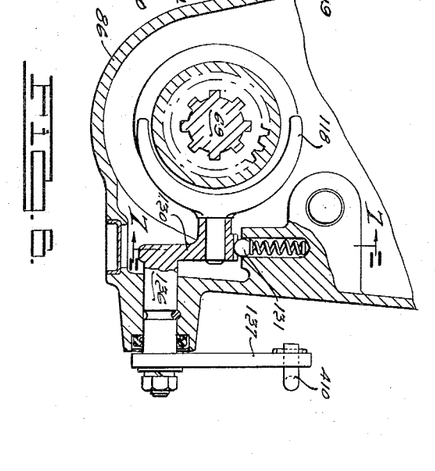
Fig. 6 is a sectional view taken substantially on the line 6—6 of Fig. 1 and looking in the direction of the arrows.
Figure 7:
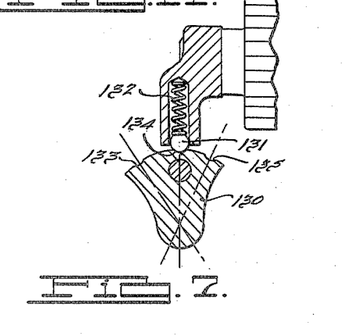
Fig. 7 is a sectional view taken substantially on the line 7—7 of Fig. 6 and looking in the direction of the arrows.

In order to obtain the above three positions of the gear 71, the shifter fork 118 is carried pivotally in a lever arm 130 which oscillates around its fulcrum stud 136 supported in the gear case 86, and has a lever 137 secured to it on the exterior of the gear case for controlled operation (see Fig. 6). The three functional positions of the gear 71 are predetermined by three detent grooves 133, 134 and 135 in the periphery of the lever arm 130, in any one of which grooves a ball 131, backed by a spring 132, can yieldably hold the lever arm 130, the shifter 118 and the gear 71 against independent motion.

FUNCTIONAL DESCRIPTION OF THE TRANSMISSION

The various component parts of the transmission coact to impart three different forward speeds to the final drive shaft, and also make it possible to use the power source as a brake for the vehicle in two of the forward speeds. These functional relationships of the various parts will be described with reference to each specific result that they produce.

*Engine running, vehicle standing*

When the vehicle is at a standstill and the engine crankshaft is rotating, the power can be disconnected at two distinct points, i. e., (1) by releasing both of the clutches 15 and 16, and (2) by shifting the gear 71 on the drive shaft 69 into the neutral position in which it is shown in full lines in Fig. 1.

In the first instance, i. e., complete release of both friction clutches, all the shafts and gears in the transmission stand still, the rotating parts being the flywheel 2, the clutch cover 8, and all the parts mechanically attached thereto, such as the hub 100, the cylinder groups 22 and 23, the oil sleeve 14, the levers 10 and 12, the studs 3 and 4, and the pressure plates 5 and 6. The oil pump rotor 88' is also being driven, and the oil that it supplies, instead of being fed into the cylinder groups 22 and 23 for energizing the clutches, is by-passed and dumped back into the gear case 86.

In the other instance, i. e., the gear 71 in the neutral position, and both clutches engaged, all the shafts and gears in the transmission are in motion except the final drive shaft 69 and the gear 71 on it.

*Transmission in low gear*

By shifting the gear 71 toward the final drive gear 67 by the shifter 118, the dog clutch teeth 74 and 75 couple these gears together, and by directing pressure oil into the cylinders 22a, 22b and 22c while withholding it from the cylinders 23a, 23b and 23c, through the agency of suitable control means presently to be considered, the lowest speed ratio will be obtained.

The pressure oil will displace the pistons 21 outwardly toward the open end of the cylinders 22a, 22b and 22c thereby causing the levers 10 to pivot about their fulcrum pins 9 and apply pressure on the pins 11 by their lever arms 101. The pins 11 will force the studs 3 to slide axially toward the flywheel 2, thereby exerting pressure on the plate 15' by the shoulder 96, and compressing the plate 15' between the face 91 and the face 90 on the flywheel 2.

The clutch plate 15' will transmit the rotation and torque to the shaft 19 and the sun gear 87 thereon, which would normally cause the planets 36 meshing with it to rotate around their shafts 37; however, these planets are also in mesh with the internal toothed gear 35, and since the planet carrier cage is part of the final drive and is offering torsional resistance to motion, the reaction of the planet teeth against the teeth of the internal toothed gear 35 tends to give this gear a backward rotation opposite to that of the sun gear 87. This backward rotation of the internal toothed gear 35 will bring into action, in an instant, the one-way coupling rollers 32, which will jam between the teeth 33 and the raceway 82, thereby arresting the motion of the internal toothed gear 35, the shaft 20 and the clutch plate 16' connected with it.

With the internal toothed gear 35 thus functioning as the stationary member in the planetary gearing, the planets 36 will revolve around the sun gear 87 and propel the carrier cage 39, the shaft 40 and the gear 42 around forwardly at a reduced speed from that of the sun gear 87.

The rotation of the gear 42 is transmitted to the final drive shaft 69 through the intermediate gear 60 to the final drive gear 67, and from it into the shaft 69 through the dog clutch teeth 75 and 74 and splines 70 thereon.

*Transmission in second gear*

To effect an intermediate or "second speed" drive, the clutch 15 is released and clutch 16 is engaged by energizing the cylinders 23a, 23b and 23c. This causes the pistons 21 of cylinder group 23 and the levers 12 to exert pressure on the pins 13 of the studs 4, whereby these studs will push the pressure plate 6 into engagement with the clutch plate 16' and clamp the latter against the face 93 of the driving disk 7.

The clutch plate 16' drives the shaft 20 and the internal toothed gear 35 connected to it. With the planet carrier cage 39 offering resistance to rotation, the planets 36 will begin to accelerate the sun gear 87 in the opposite direction of rotation from that of the shaft 20, but in this they will immediately be restrained by the one-way reaction brake rollers 46, which rollers will be wedged between the teeth 57 and the raceway 50, and will prevent any counter rotation. With the sun gear 87 thus secured as the reaction point, the planets 36 will revolve around it and impart to their cage 39, the shaft 40 and the gear 42 a reduced forward speed somewhat higher than the speed in the previous case of the "low gear" drive.

From the gear 42 to the final drive shaft 69 the same parts perform the same functions as in the case of the aforementioned "low gear" drive.

*Transmission in "high gear"*

This condition is often referred to as "direct drive," and implies the least reduction of speed between the engine and the vehicle axle. To this end both of the clutches 15 and 16 are brought into engagement through the instrumentalities above described in connection with each individual clutch, which means that the pistons 21 of both cylinder groups 22 and 23 will be energized simultaneously by pressure oil. Consequently, the two shafts 19 and 20 will rotate in unison, as will the sun gear 87 and the internal toothed gear 35. There being no relative motion possible between these two gears, they will rotate, together with the planets 36 between them, as a single body, as will the planet carrier cage 39, the shaft 40 and the gear 42.

In this relationship, therefore, there is no reduction or increase in the speed of the crankshaft 1 up to this point; any such alteration of the crankshaft speed can be effected between the gear 42 and the final drive shaft 69 by proportioning the gears 42 and 67 suitably in size to the "direct drive" requirements.

*Transmission in reverse gear*

By shifting the sliding gear 71 on the shaft 69 from its neutral position into position 71b, its teeth 72 will be brought into mesh with the teeth of the reverse idler gear 65, and the power is then conveyed from the gear 42 through the gears 60 and 61 to the reverse idler gear 65, to the sliding gear 71, and through splines 70 to the drive shaft 69. The main drive gear 67 becomes an idler.

It will be seen that the shifting of the sliding gear 71 for reverse drive into position 71b might be effected in any one of the three previously mentioned forward speeds, i. e., with either one of the two clutches 15, 16, or both of them, engaged, and three different reverse gear ratios are hereby obtainable. For passenger car operation it would be sufficient to use only one reverse speed, of the lowest ratio, by engaging clutch plate 15 which yields the low forward speed, and reducing this speed still further by suitable proportioning of the gears 61 and 72.

*Using the engine as a brake*

With the transmission in "high gear," when the engine speed is reduced, the momentum of the vehicle will propel the final drive shaft 69 and thus reverse the application of torque on all gear teeth in engagement, though not reversing the direction of rotation of any of the shafts.

When the transmission is in "high gear," both clutches 15 and 16 are engaged, and if the shaft 69 becomes driving instead of driven, i. e., if the torque from the outside exceeds the torque produced by the crankshaft 1, no operational change takes place, both clutches 15 and 16 transmitting the driving power of the vehicle to the crankshaft 1 to be absorbed by the pumping action of the engine.

It is often found necessary to utilize increased braking action of the engine with the transmission in second gear, as when descending steep hills. In that case, the transmission disclosed hereinabove has the clutch 16 in engagement while the clutch plate 15' is being held stationary by the one-way reaction brake rollers 46. Should the torque direction be reversed on the teeth of the planets 36, it would make them change their point of reaction from the sun gear 87 to the internal gear 35, because the latter would be driven by the carnkshaft 1 at a slower speed than the planet cage 39 and, consequently, the planets 36 would set the sun gear 87 and the shaft 19 in motion in their normal direction of rotation; this action would disengage the shaft 19 from its arrested position by the one-way coupling rollers 46, and would make it spin freely because its clutch plate 16' is not then engaged, and no positive connection between the final drive shaft 69 and the crankshaft 1 for braking action by the engine would exist.

In order to provide such a connection, and thus make it possible to use the engine as a brake when the transmission is in second gear, the friction braking plate 55 is made use of. By energizing the piston 52 with pressure oil through passages 53, the piston compresses the facings 56 between its thrust side 112 and the inner side 111 on the cover 58, and prevents the shaft 19 from rotating, thereby establishing a reaction point for the planets 36 when their carrier cage 39 is driving, and enabling the provision of a two-way second gear drive whenever the engine braking action is required in that speed.

CONTROL SYSTEM: FLUID SUPPLY SYSTEM AND MAIN CONTROL VALVE

From the engine driven or front pump 88 fluid is conducted through conduit means 129 to a port 205 extending through the side of a valve body 206 within which a main control valve element 208 is axially slidable. A sleeve 210 is provided in the body forming a replaceable bearing for the valve element and carrying the inwardly opening channels with which the chambers and spools of the valve cooperate. The valve assembly is ordinarily urged to the right (as viewed in Figs. 10-13 inclusive) as far as the first speed position shown in Fig. 11, by compound spring means including the two helical compression springs 214, 216, while a coacting spring 212 opposes movement of the valve farther to the right, or from the first speed position of Fig. 11 to the neutral position of Fig. 10. The action of spring 212, 214, 216 will presently be considered in greater detail, but it is to be noted that the valve is movable in predetermined steps, the proportions of the stepwise movements being delineated by detent means including a spring pressed poppet 218 slidable in a lateral bore 220 in the side of the valve casing 206 and urged by means of its detent spring 224 into engagement with notches 222 formed in the valve. The valve is thus movable in step fashion to divert the fluid supplied through the conduit 129 and port 205 in such manner as to cause engagement of either of the clutches 15, 16 independently, or both of such clutches simultaneously, as may be required to establish any of the several gear ratios in the manner previously described.

The valve is automatically movable under the influence of vehicle speed, although such automatic action may be modified under certain conditions or when the driver desires. The means for moving the valve will presently be discussed, but consideration will first be given to the several positions which the valve occupies, and the fluid flow in each of such positions.

Figure 10:
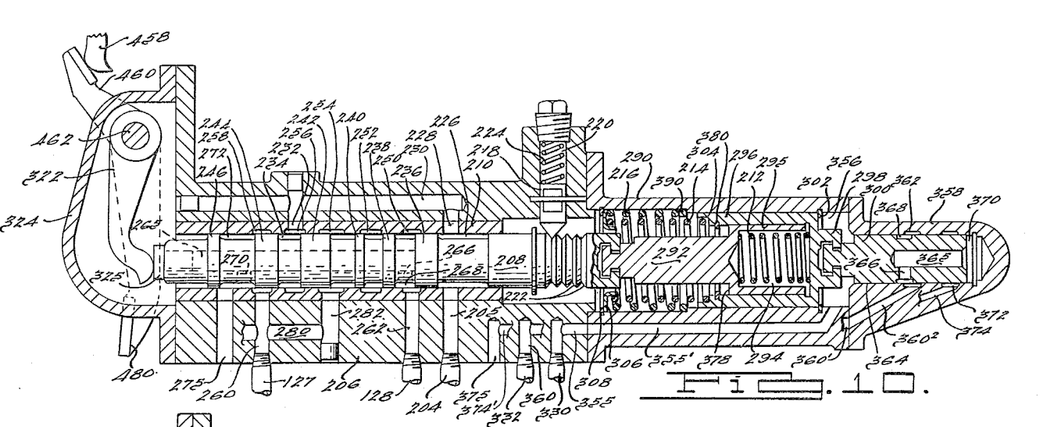
Figs. 10, 11, 12 and 13 are similar longitudinal sectional views of the main speed control valve assembly, showing the same in different positions occupied thereby during operation.

In Fig. 10 the valve is shown in neutral position and at such time the fluid from the engine driven pump 88 enters valve chamber 226 through port 205, flows through a port 228 arranged opposite the port 205, and through a longitudinal bore 230 in the valve casing to a radial port 232. Port 232 is then in communication with valve chamber 234, but this chamber is sealed off since the valve spools 242, 244 then engage the interior of the sleeve 210 upon either side of the internal channel 256.

With the valve in this position, the fluid supply systems connected to both of the clutches 15, 16, or more exactly to the actuating cylinders 22, 23 for the clutches 15, 16 respectively, are vented to atmosphere. Conduit 127 which is connected to the actuating cylinders 22a, 22b, and 22c for the first speed clutch 15 is connected to a port 260 in the side of the valve casing 206, while conduit 128 which leads through passages previously described to the actuating cylinders 23a, 23b, and 23c for the second speed clutch 16 is connected to a port 262 also formed in the side of the valve casing 206 at a spaced point. The valve body 208 is provided with an axial bore 265 closed at both ends. A radial bore 266 provides communication between the axial bore 265 and valve channel 268 between valve spools 236, 238, while a similar radial passage 270 provides communication between the axial bore 265 and valve chamber 272 located between spools 244, 246. Any fluid pressure within the low speed forward drive clutch 15 actuating cylinders of group 22 and their connected conduit 127 is vented through port 260, valve casing chamber 258, valve channel 272, and vent port 275 which is then uncovered by the registering of valve channel 272 therewith. Vent port 275 may, of course, have a return connection (not shown) to the sump for the actuating fluid supply, which sump is indicated as comprising the bottom of the gear case 86. Second speed forward drive clutch 16 and its connected conduit 128 are at the same time vented to atmosphere by way of valve passage 262, valve casing channel 250, valve chamber 268 located between valve spools 236, 238, and by way of the axial bore and connected passages 266, 265, 270 to valve chamber 272 and thus to vent port 275. Since fluid pressure is thus cutoff from both actuating means for the two friction clutches and the actuating cylinders are vented to atmosphere, the clutches are held in the released positioning by their release springs 26, 27 and the transmission is in neutral as above described.

Figure 11:
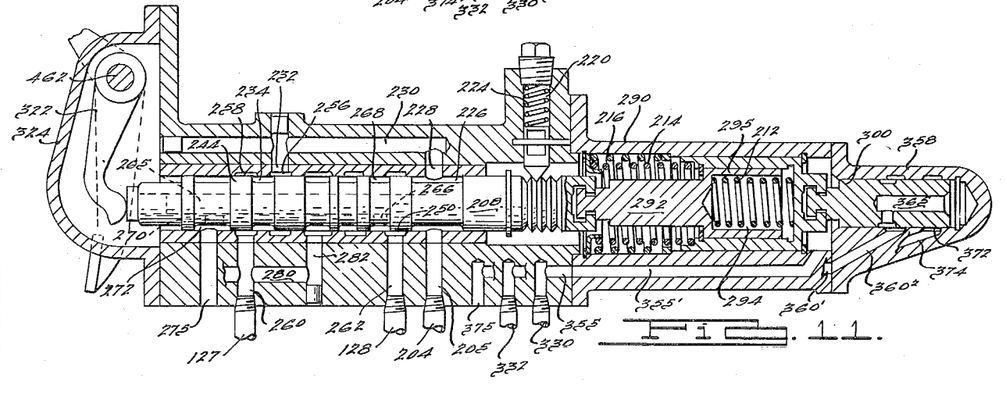

When the valve 208 is moved one step to the left, to the position shown in Fig. 11, the fluid entering through conduit 129 and port 205 passes through valve chamber 226 and passages 228, 230, 232 to valve casing channel 256 and valve chamber 234 which then overlaps both the channel 256 and the spaced channel 258 to which the port 260 and conduit 127 leading to the first speed clutch 15 are connected. It will be noted that port 260 is at this time sealed off from the exhaust passage 275 by the spool 244, and pressure is thus supplied to engage the first speed clutch. The second speed clutch 16 remains disengaged by reason of the fact that the actuating cylinders of the group 23 remain vented to atmosphere by way of conduit 128, port 262, and the internal valve channels, chambers, and passages 250, 268, 266, 265, 270, 272, 275. With the forward clutch 15 engaged and the second speed clutch 16 disengaged, second speed drive is established in the manner previously described.

Figure 12:
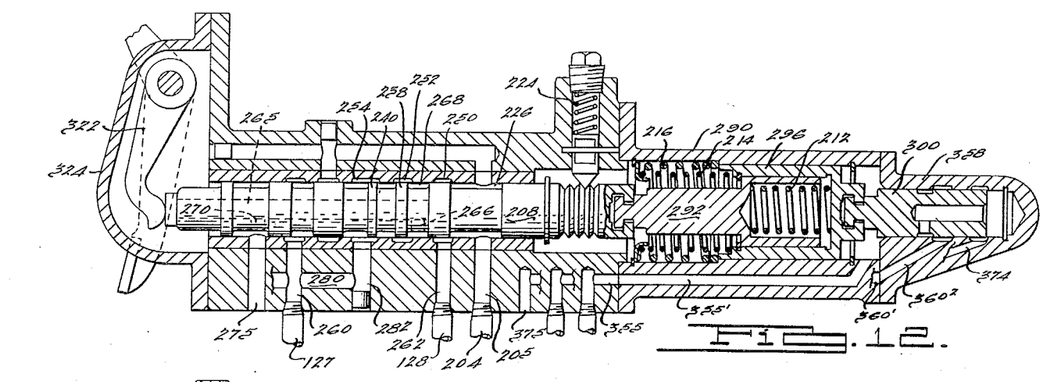

When the valve 208 moves to the left one further step, to the position shown in Fig. 12, the forward clutch 15 is disengaged and the second speed clutch 16 engaged, to establish second gear drive. At this time the first speed fluid passage 260 and connected conduit 127 leading to the low speed clutch actuating cylinders of group 22 is vented to atmosphere through a branch passage 280 and a connecting radial port 282 formed in the valve body and in communication with the low speed clutch passage 260. Passage 282 is connected to valve sleeve channel 254. It will be noted that with the valve in this position spool 238 lies in sleeve channel 252 and is narrower than this channel and centered with respect thereto, so that the channel overlaps both sides of and thus bypasses this spool. Likewise spool 240 lies within and is spaced from both ends of sleeve channel 254, being narrower than this channel, which then overlaps both sides of the spool and so in effect by-passes the spool. Communication is thus established from port 282 past both of the spools 240, 238 and to the valve chamber 268 into which the vent port 266 formed in the body of the valve opens. The fluid pressure in the first speed clutch actuating system may thus escape through the axial bore 265 to radial valve bore 270 and thus to exhaust passage 275. Supply of fluid under pressure to the second speed clutch is established from the supply line 129 and port 205 directly through valve chamber 226 to valve channel 250 connected, as previously noted, to valve passage 262, to which the conduit 128 leading to the second speed clutch actuating cylinder system is connected.

Figure 13:
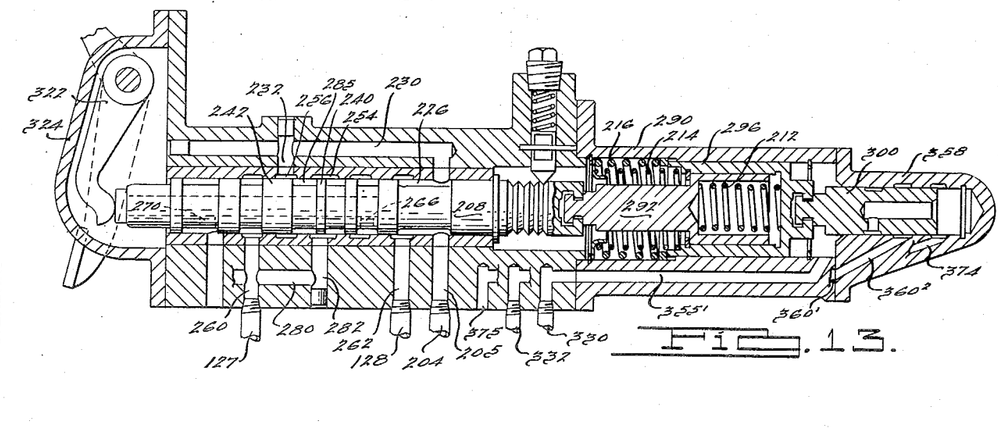
Figure 14:
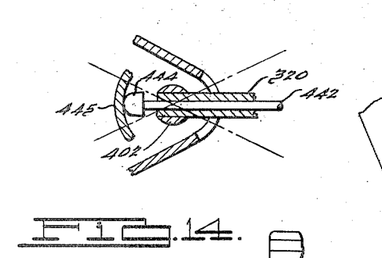
Fig. 14 is a fragmentary diagrammatic sectional plan view of the hand control lever, taken substantially on the line 14—14 of Fig. 9.

When the valve 208 moves to the left one further step, which is the last position and is indicated in Fig. 13, fluid conductive communication is established between the supply conduit 129 and passage 205 and both clutch actuating cylinder groups 22, 23, so that both clutches become engaged to establish the high speed drive in the manner previously described. Communication to the first speed clutch occurs by way of valve chamber 226, passages 230, 232, valve sleeve channel 256, valve chamber 285 located between valve spools 240, 242, valve sleeve channel 254 and passages 282, 280, and 260 to the conduit 127 leading to the low speed clutch actuating means. Communication between the supply conduit 204 and the conduit 128 leading to the second speed clutch actuating system again occurs as in the second speed drive directly through the valve chamber 226 which then provides communication between ports 205, 262.

It will be apparent that upon reverse movement of the valve toward the right and successively back to the positions shown in Figs. 12 and 11, the valve reassumes the previously described positions and successive downshifts resultantly occur to second and first speeds, while neutral is established when the position of Fig. 10 is reached.

CONTROL SYSTEM: CONTROL VALVE ACTUATING MEANS—AUTOMATIC

An extension casing cylinder 290 carried by one end of and coaxial with the valve casing 206 houses the actuating springs 212, 214, 216 and associated mechanism by which automatic longitudinal movements of the valve are induced. A stem 292 is attached to the end of the valve and projects axially into the cylinder 290. At its end remote from the valve body the stem 292 is enlarged and chambered as indicated at 294. The enlarged portion of the stem is designated 295 and is provided with a smooth cylindrical exterior over which a hollow cylindrical piston 296 slidably fits. At its outer end the piston 296 overlies the chamber 294 and the head of the piston carries keying means generally designated 298 serving to couple to the piston an extension in the form of a piston valve 300. Piston valve 300 slides in a cylinder 364 formed in cylinder head 358. Fluid pressure in cylinders 290, 364 functions to vary the loading of springs 212, 214, 216 and thus influence the position assumed by the valve 208.

Outward movement of the piston 296 is limited by a snap ring 302 seated in an internal groove (undesignated) formed in the cylinder 290. Spring 214 bears outwardly against the skirt of the piston sleeve 296, which is counterbored as indicated at 304 to form a seat for the spring. The spring is of the helical compression type. At its inner end spring 214 seats against a flanged retainer 306 positioned by a snap ring 308 also seated in an appropriately positioned groove formed interiorly of and near the inner end of the cylinder 290.

The control valve is moved to the extreme right-hand position, as viewed in Fig. 10, which puts the transmission in neutral, as previously explained, by positive mechanical action, whenever through the agency of neutral shifting means associated with the shift lever 320 and presently to be described in greater detail, the driver moves the finger piece 322 away from the end of valve 208. Finger piece 322 is mounted in a combined cover and supplemental casing member 324 arranged at the opposite end of the valve casing 206 from that occupied by the cylinder 290. The finger piece is adapted to bear against a headed plug 325 carried by the end of the valve element 208 and serving as a closure for the axial bore 265. The sleeve 210 is open at its end within cover 324 to expose the end of the valve, and the valve is moved to the neutral position shown in Fig. 10 only when positively actuated thereto by the finger piece 322. Movement of the valve to such neutral position compresses the spring 212, and the force exerted by spring 212 when the valve is in the neutral position is sufficient to move the valve piece back to the first speed against the resistance of the poppet 218 when the finger piece is moved away from the end of the valve, regardless of whether any fluid pressure exists in head chambers 356, 370.

Fluid pressure developed by the rear or propeller shaft driven pump 79 is delivered through conduit 139 and through pressure limiting valves 326, 328 and conduits 330, 332, to the cylinders 290, 364.

The valves 326, 328 are incorporated in a single casing 335 and the conduit 139 is connected to such conduit through metering means shown as a coupling element 336 having a restricted orifice therein. From the metering element fluid is conducted through a double branched conduit 338 to valve 326 and to a passage 342 in the valve casing. Valve 326 is in the form of an adjustable needle valve which controls the connection between the inlet conduit 338 of the casing 335, and an exhaust opening 340 which is metered by the needle valve. It will be seen that the pressure developed in the system beyond this point depends upon the restricttion provided by the needle valve. Passage 342 extends straight through the valve casing 335 and is connected to the conduit 330. A branch passage 344 in the casing 335 connects passage 342 to a cylindrical valve chamber 345 in which the cylindrical piston-type valve 328 is slidable. Valve 328 serves as a throttling valve by which a further pressure drop may be imposed between the pressure present in passage 342 and that in conduit 332. When valve 328 is moved upwardly, as viewed in Fig. 9, its peripheral chamber 346 moves in a direction to close off the passage 344 and so interrupt communication between passage 344 and passage 348 to which the conduit 332 is connected, while when the valve is moved downwardly the effective cross sectional area of the connection between passages 344 and 348 is increased. The valves 326 and 328 may be selectively actuatable by the driver as by means of suitable controls (not shown) mounted upon the instrument panel of suitable controls (not shown) mounted upon the instrument panel of the vehicle, and by Bowden wire means connected thereto and fragmentarily indicated at 350, 352.

Conduit 330 is connected to the side of the valve casing 206 in such manner as to communicate with a passage 355 in the valve casing, and with an extension passage 355' located in the casing cylinder 290 and forming a continuation of the passage 355. Bore 355' leads to the outer end of the cylinder where it communicates with head chamber 356. The pressure thus delivered to chamber 356 acts upon the outer end of piston 296, as will be apparent, the end of cylinder 290 being closed by the head 358 attached in sealed relation thereto.

Pressure fluid delivered from the rear pump by way of throttling valve 328 and conduit 332 is led to a port 360 formed in the valve casing 206. An extension 360' of the passage 360 is formed in the cylinder 290 and communicates with a further extension portion $360^2$ drilled or otherwise formed in the head 358. At its outer end passage $360^2$ communicates with an internal channel 362 formed in the inner periphery of the cylindrical opening 364 in the head 358, in which opening the piston valve element 300 travels. An axial bore 365 is formed in piston valve 300 inwardly from the outer end thereof. Axial bore 365 communicates with a radial passage 366 and peripheral piston valve channel 368 so that with the piston valve in certain positions communication is established between the head chamber 370 at the outer end of the piston valve and the passage 360².

A channel 372 formed in and nearer the outer extremity of the cylindrical opening 364 in the head is adapted to be uncovered by the piston valve 300 when it and the connected piston 296 move inwardly to the positions they assume in moving control valve 208 to the higher speed positions. Channel 372, which is thereby at such times placed in communication with the head space 370, communicates with a head passage 374 which is connected to an extension 374' of such passage, the extension being located in valve casing 206 and leading to an exhaust opening 375.

When the finger 322 moves away from plug 325 by the hand shifting means, spring 212 expands, moving stem 292 and the connected valve 208 to the left, as viewed in Figs. 10 and 11, from the position of Fig. 10 to the position of Fig. 11. The shoulder 378 formed by the enlarged chambered portion 295 of the stem 292 then comes up against a stop formed by a snap ring 380 seated in a suitable groove (undesignated) inscribed within and near the free extremity of the skirt of piston 296. This occurs as the poppet 218 drops into the second notch 222 and the low gear forward drive position of the valve is reached, as shown in Fig. 11. The vehicle may now be accelerated in low gear, and the resultant operation of the rear pump 79 develops pressure in connected conduit 139.

The pressure builds up in the valve casing 335, assuming that the needle valve 326 is closed far enough to permit such build-up of pressure, as is normally the case. Pressure communicated through conduit 330 enters cylinder space 356 by way of passages 355, 355' and also enters head space 370 by way of valve 328, conduit 332, and passages 360, 360' and connected ports and passages 368, 366, 365. When the vehicle reaches a predetermined speed, sufficient leftward pressure is thereby exerted upon the piston 296 and piston valve 300 to compress spring 214 and move the stem assembly 292, 295 to the left a distance equal to the spacing of one of the notches 222, which movement also brings the skirt of the piston 296 into engagement with a ring 390 which forms a seat for the outer extremity of spring 216. The valve 208 thus assumes the position shown in Fig. 12, in which the fluid system is arranged to institute and maintain the second gear drive, in the manner previously described.

It will be noted that as the piston valve 300 moves to the left from the first speed position of Fig. 11 toward the second speed position of Fig. 12, fluid supply channel 362 is cut off, so that the only effective liquid pressure exerted upon the pistons and upon the valve 208 is that resulting from pressure delivered to cylinder 356 by way of passages 355, 355' and connected conduit 330. When this pressure reaches such proportion as to overcome the resistance of spring 216 and of the poppet 218, which it does at a predetermined further increase of car speed, the valve 208 is snapped to the left one further position, compressing the spring 216 as the skirt of the piston 296 forces the ring 390 inwardly. As the piston valve 300 moves to the left-hand or high speed position shown in Fig. 13, the channel 372 is uncovered, venting head space 370 to atmosphere by way of passages 374, 374' and exhaust port 375. Channel 362 remains sealed off, the entire fluid supply for movement of the valve assembly to and maintaining the same in the high speed position is derived from conduit 330, the pressure in which is regulated only by the needle valve 326 and metering port 336.

It will be apparent that the speed at which the shift from first speed to second speed occurs is variable by adjusting the positioning of throttling valve 328, since the pressure derived by way of this valve is exerted in head chamber 370 only during the shift from first to second gear. The speed at which all automatic shifts occur may be regulated by adjustment of the needle valve 326 which, as will be apparent, varies the pressure of the fluid supplied through both of the conduits 330 and 332.

As shown in Fig. 9, the hand lever 320 is movable in a plane substantially parallel to that of the steering wheel 400, to rock the shifter shaft 402 around its axis through a limited arc of movement. The shifter shaft lies alongside the steering column which is generally designated 404 and indicated as arranged in the conventional manner. An arm 405 is secured to the lower end of the shaft 402 and articulated as by means of a link 406 to a bellcrank 408 which is, in turn, connected by means of the link 410 to operating arm 137 for the forward-neutral-reverse shifter yoke 118. At one extremity of its angular movement, therefore, the shifting lever 320 lies in a forward position in which the yoke 118 maintains the shiftable clutch gear element 71 in the position 71a, in which the teeth 74 and 75 are engaged and the forward drives are effective, as previously described. At the other extremity of its movement the control lever 320 lies in a reverse position, the gear teeth 72 being thereby engaged with the reverse idler gear 65, as the clutch gear assembly 71 then lies in the position 71b and reverse drive is effective, as previously described.

Also coupled to the bellcrank 408 as by means of a link 412 is a dump valve 415 arranged to vent the pump 88 at all times when the shifting lever 320 is in the neutral position intermediate its forward and reverse positions previously described. The dump valve is also of the balanced piston-type, connected to the output of the pump 88 by a branch conduit 129', which enters the dump valve casing 414 in a central position and opens into a central chamber 416 therein. The valve element, generally designated 415, is provided with a central spool 420 and spools 422, 424 at its ends. The valve casing is also formed with chambers 425 and 426 spaced from the central chamber 416 by reduced areas 428 and 430 which the spools of the valve accurately and slidably fit. When the valve element 415 is in the centered position, it occupies with the shift lever in neutral, the conduit 129' is connected to the exhaust ports 432 and 434, while when the valve is moved in either direction the port 204² is isolated, permitting the pump 88 to build up pressure in the line 129 and actuate the hydraulically shiftable control valve and related elements in the manner previously described.

It will be noted that the neutral position of the shift lever 320 previously described releases the clutch gear assembly 71 from engagement with both the forward and reverse driving means, and so effects a mechanical neutral, while at the same time releasing the fluid pressure through the agency of the dump valve 415. Under some conditions, particularly in extremely cold weather, this may not completely release all pressure in the hydraulic system, and an additional neutral arrangement, which may, if desired, be used as an alternative to the neutral means already described, is shown in the form of means for actuating the finger piece 322 in such manner as to cause the main control valve 208 to move to the neutral position of Fig. 10 in the manner previously described. This may be effected by means of a manually operable button 440 mounted upon the end of the shift lever 320 and movable in and out in a line parallel to the axis of the shift lever. The button 440 is fast upon the end of a rod 442 extending longitudinally inwardly through the shift lever and through and beyond the axis of the shifter shaft 402. At its inner end the rod 442 carries a button-like tip 444 engageable with an enlarged pad 445 carried by one arm 448 of a bellcrank pivoted on the steering column, as by means of the transverse pin 446. The other arm 448' of the bellcrank is connected by means of a link 450 which extends longitudinally down the steering column to a second bellcrank 452 pivoted upon a pin 454 at the bottom of the steering column. Additional means completing mechanical connection to the finger piece 322 include the link 455 and a bell crank 456, one arm 458 of which is adapted to bear against an arm 460 fast upon the shaft 462, to which shaft the finger piece 322 is also attached. A helical tension spring 464 reacts upon the bell crank 452, tending to swing it in such direction as to urge the valve 208 toward neutral position and to move the button 440 outwardly, the outer position of the button representing the neutral position. A ball detent element 465 urged outwardly by a leaf spring 466 into either of two pockets 468 and 470 interiorly formed in the cylindrically counterbored outer end 472 of the shift lever 320 serves as means for holding the button in either position. A cylindrical enlargement 474 of the rod 442 houses the detent ball 465 and its actuating leaf spring 466, and constitutes means for attaching the button 440, which is threaded into the tapped extremity of the hollow cylindrical portion 474. The leaf spring 466, as shown in Fig. 9, may be carried by the threaded boss portion 475 which serves as attaching means for the button. The total resistance offered by the detent 465, spring 464 and detent 218 is sufficient to maintain the valve 208 in the neutral position shown in Fig. 10 against the effort of the spring 212. When the finger piece 322 is moved away from the pad 325 on the end of valve 208, however, by pushing the button 440 into the inner or starting position, the spring 212 overcomes the resistance of the poppet 218 and valve 208 moves to the forward drive low-speed position of Fig. 11 as previously explained.

It will be apparent that successive up-shifts, during normal acceleration of the car forwardly, are the result of increasing pressure developed by the rear pump 79, and that such pressure is a function of car speed. Downshifts ordinarily also occur as a function of reducing car speed, as the pressure developed by pump 79 falls away, although it will be apparent that downshifting is delayed by the action of the poppet 218 so that once a higher speed ratio has been established, the car may be decelerated considerably without immediately causing a downshift. In order to provide an automatic "kickdown" shift to a lower speed when the throttle is opened wide or the accelerator pedal is pushed down to a predetermined position, means is provided for positively moving the valve 208 from high speed to second speed position when the accelerator pedal is moved to or beyond full throttle opening. Such means comprises an arm 480 fast upon the shaft 462 and engageable by a finger piece 482 actuatable by means of a link 484 coupled to the arm 482 and also coupled to an arm 485 secured to and moveable with the accelerator pedal 486. Arm 485 may swing co-axially about the shaft 488 upon which the accelerator pedal is pivotally mounted.

Means may also be provided for preventing a kickdown shift when the vehicle is traveling above a predetermined speed in high gear. The speed at which the kickdown lockout action becomes effective is, of course, selected in such manner that the kick-down is locked out at the speed above which increased acceleration would not be obtained from a downshift. The lockout means is indicated as comprising a hydraulically actuatable piston element 490 mounted in a cylinder 492 and having a stem 494 projectable from the cylinder to engage an arm 495 rigidly secured with respect to the arm 482 and shown as attached to the same pivot pin 496. Piston and stem assembly 490 and 494 are shown as urged inwardly, in a direction to free the arm 495, by a helical compression spring 498 housed in the cylinder 492, the piston and stem being movable outwardly to a position in which they block movement of the arm 482 to the position corresponding to the second gear position of the valve 208, by hydraulic pressure supplied by the rear pump 79. For this purpose the space within the cylinder 492 below the piston 490 is connected to the output conduit 139 from the rear pump by means of a branch conduit 139². When the pressure developed by the rear pump exceeds a predetermined value corresponding to a selected car speed determined as above noted or otherwise as the designer or engineer may prefer, the resistance of spring 498 is overcome, and stem 494 moves outwardly, blocking movement of the arm 482 to a position which would cause a downshift, although it will be apparent that for a certain range of speed within which the pressures upon opposite sides of the piston 490 are substantially balanced, it may be possible to force a downshift if the driver bears down heavily upon the accelerator pedal to intentionally cause such a shift by overcoming the fluid pressure.

CRANKING ENGINE FROM DRIVING WHEELS

Since the fluid pressure supplied for actuating the friction clutches 15 and 16 is derived entirely from the front pump in the normal operation of the transmission as thus far described, it is not possible to start the engine by pushing or towing the vehicle without the provision of supplemental means for directing fluid pressure from the rear pump to the fluid pressure actuating means for such clutches. To provide for push-starting or tow-starting, therefore, diverting valves 500 and 502 are arranged in the fluid conduits 127 and 128, respectively, as diagrammatically indicated in Fig. 9, such valves being depicted as of the rotary three-way type, arranged to normally stand in the positions shown in Fig. 9 in which a branch conduit 139³ connected to the rear pump and to the bodies of the valves 500 and 502 is normally cut off, while direct communication is provided from the main control valve body 206 to the clutches and their actuating means by way of conduits 127 and 128. When the valves 500 and 502 are rotated 90° counterclockwise, as the parts are viewed in the drawing, however, communication between the main control valve and clutch actuating means is cut off. When the diverting valves are so positioned, direct communication is established between the rear pump and the supply conduits leading to the clutch actuating means, by way of conduits 139, 139², 139³ and valves 500 and 502, as will be apparent, and upon movement of the vehicle at a speed sufficient to develop adequate pressure to engage the clutches 15 and 16, such clutches are simultaneously engaged to provide a direct drive between the rear wheels and the engine and thereby crank the latter.

The second speed lock-up means for preventing free wheeling in second gear may also be controllable by means of a manually operable valve as 202 incorporated in a branch conduit 128' connected to conduit 128 and communicating with passage 53 leading to the space beneath piston 52.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

I claim:

A control system for an automatic automotive transmission of the type including driving clutches and hydraulic actuating means for the clutches for selectively establishing and disestablishing different gear ratios, and a reversing gear element selectively movable to and from at least three positions including a forward driving position, a neutral position and a reverse driving position, a control member adapted to be mounted in a position convenient to the driver of a vehicle in which such a transmission and control system are installed, said member being bodily movable to move said reverse gear element to and from said three positions, a valve for regulating the action of said hydraulic actuating means, and a supplemental actuating element for said valve carried by said control member and movable independently of such bodily movement of the control member to cause actuation of said valve to a position to interrupt the fluid supply to said hydraulic actuating means for the clutches, whereby by movement of said supplemental actuation element all of said clutches may be released to establish a further neutral condition.

References Cited in the file of this patent

UNITED STATES PATENTS

| Number | Name | Date |
|---|---|---|
| 1,256,371 | Rowledge | Feb. 12, 1918 |
| 1,428,221 | Martino | Sept. 5, 1922 |
| 1,619,703 | Chorlton | Mar. 1, 1927 |
| 2,100,810 | Livermore | Nov. 30, 1937 |
| 2,102,781 | Bieretz | Dec. 21, 1937 |
| 2,143,321 | Kegresse | Jan. 10, 1939 |
| 2,150,950 | Thoma | Mar. 21, 1939 |
| 2,151,714 | Pavesi | Mar. 28, 1939 |
| 2,155,198 | Lawrence | Apr. 18, 1939 |
| 2,163,202 | Kegresse | June 20, 1939 |
| 2,169,639 | Grote | Aug. 15, 1939 |
| 2,169,304 | Thompson | Mar. 12, 1940 |
| 2,204,779 | Shennes | June 18, 1940 |
| 2,223,716 | Bojesen | Dec. 3, 1940 |
| 2,231,411 | Lawrence | Feb. 11, 1941 |
| 2,231,966 | Swennes | Feb. 18, 1941 |
| 2,319,549 | Lawrence | May 18, 1943 |
| 2,332,593 | Nutt et al. | Oct. 26, 1943 |
| 2,406,225 | Kelbel | Aug. 20, 1946 |
| 2,408,951 | Pollard | Oct. 8, 1946 |
| 2,418,378 | Voytech | Apr. 1, 1947 |
| 2,445,716 | Sternberg | July 20, 1948 |
| 2,516,208 | Hasbany | July 25, 1950 |
| 2,584,965 | McFarland | Feb. 5, 1952 |
| 2,595,969 | McFarland | May 6, 1952 |
| 2,604,197 | Livermore | July 22, 1952 |

FOREIGN PATENTS

| Number | Country | Date |
|---|---|---|
| 427,879 | Great Britain | Apr. 25, 1935 |